US012633314B2

(12) United States Patent
Xu et al.

(10) Patent No.: US 12,633,314 B2
(45) Date of Patent: May 19, 2026

(54) METHOD, APPARATUS, MEDIUM AND ELECTRONIC DEVICE FOR VIDEO GENERATION

(71) Applicant: Beijing Youzhuju Network Technology Co., Ltd., Beijing (CN)

(72) Inventors: Chong Xu, Beijing (CN); Donglin Li, Beijing (CN); Wei Zhang, Beijing (CN); Lixin Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 16 days.

(21) Appl. No.: 18/729,161

(22) PCT Filed: Mar. 31, 2023

(86) PCT No.: PCT/CN2023/085775
§ 371 (c)(1),
(2) Date: Jul. 15, 2024

(87) PCT Pub. No.: WO2023/202361
PCT Pub. Date: Oct. 26, 2023

(65) Prior Publication Data
US 2025/0182793 A1      Jun. 5, 2025

(30) Foreign Application Priority Data
Apr. 22, 2022    (CN) .......................... 202210432243.7

(51) Int. Cl.
*G11B 27/031* (2006.01)
*G06F 40/205* (2020.01)
*G06F 40/30* (2020.01)

(52) U.S. Cl.
CPC .......... *G11B 27/031* (2013.01); *G06F 40/205* (2020.01); *G06F 40/30* (2020.01)

(58) Field of Classification Search
CPC ...... G11B 27/031; G06F 40/205; G06F 40/30
See application file for complete search history.

(56) References Cited

U.S. PATENT DOCUMENTS

| | | | | |
|---|---|---|---|---|
| 2012/0330952 A1* | 12/2012 | Kong | .................. | G06F 16/7867 |
| | | | | 707/E17.004 |
| 2015/0281138 A1* | 10/2015 | Niu | ..................... | G06F 16/9535 |
| | | | | 709/206 |
| 2022/0019592 A1* | 1/2022 | Yang | ..................... | G06F 16/215 |

FOREIGN PATENT DOCUMENTS

| | | |
|---|---|---|
| CN | 104731960 A | 6/2015 |
| CN | 108965737 A | 12/2018 |

(Continued)

OTHER PUBLICATIONS

International Patent Application No. PCT/CN2023/085775; Int'l Search Report; dated Aug. 6, 2023; 2 pages.

(Continued)

*Primary Examiner* — Mishawn N. Hunter
(74) *Attorney, Agent, or Firm* — BakerHostetler

(57) ABSTRACT

The disclosure relates to a method, apparatus, medium and electronic device for video generation. The method includes: obtaining webpage elements of a target webpage; extracting visual features and semantic features of the webpage elements; determining a video material matching the target webpage based on the webpage elements, the visual features and the semantic features; and generating a target video based on the video material and the webpage elements. In this way, it is possible to achieve rapid and automatic generation of webpage content into videos, thereby greatly reducing operation costs of a user, and saving video production costs. In addition, automatic recall of the video material can be implemented without manually collecting the video material, thereby saving time and effort.

13 Claims, 3 Drawing Sheets

(56)          References Cited

FOREIGN PATENT DOCUMENTS

| | | | |
|---|---|---|---|
| CN | 110309351 | A | 10/2019 |
| CN | 112287168 | A | 1/2021 |
| CN | 113033680 | A | 6/2021 |
| CN | 113596579 | A | 11/2021 |
| CN | 114363701 | A | 4/2022 |
| CN | 114786069 | A | 7/2022 |
| WO | WO 2017/120086 | A1 | 7/2017 |
| WO | WO 2022/061806 | A1 | 3/2022 |

OTHER PUBLICATIONS

China Patent Application No. 202210432243.7; First Office Action; dated May 31, 2023; 16 pages.
China Patent Application No. 202210432243.7; Second Office Action; dated Jan. 31, 2024; 17 pages.
China Patent Application No. 202210432243.7; Third Office Action; dated Apr. 17, 2024; 14 pages.

* cited by examiner

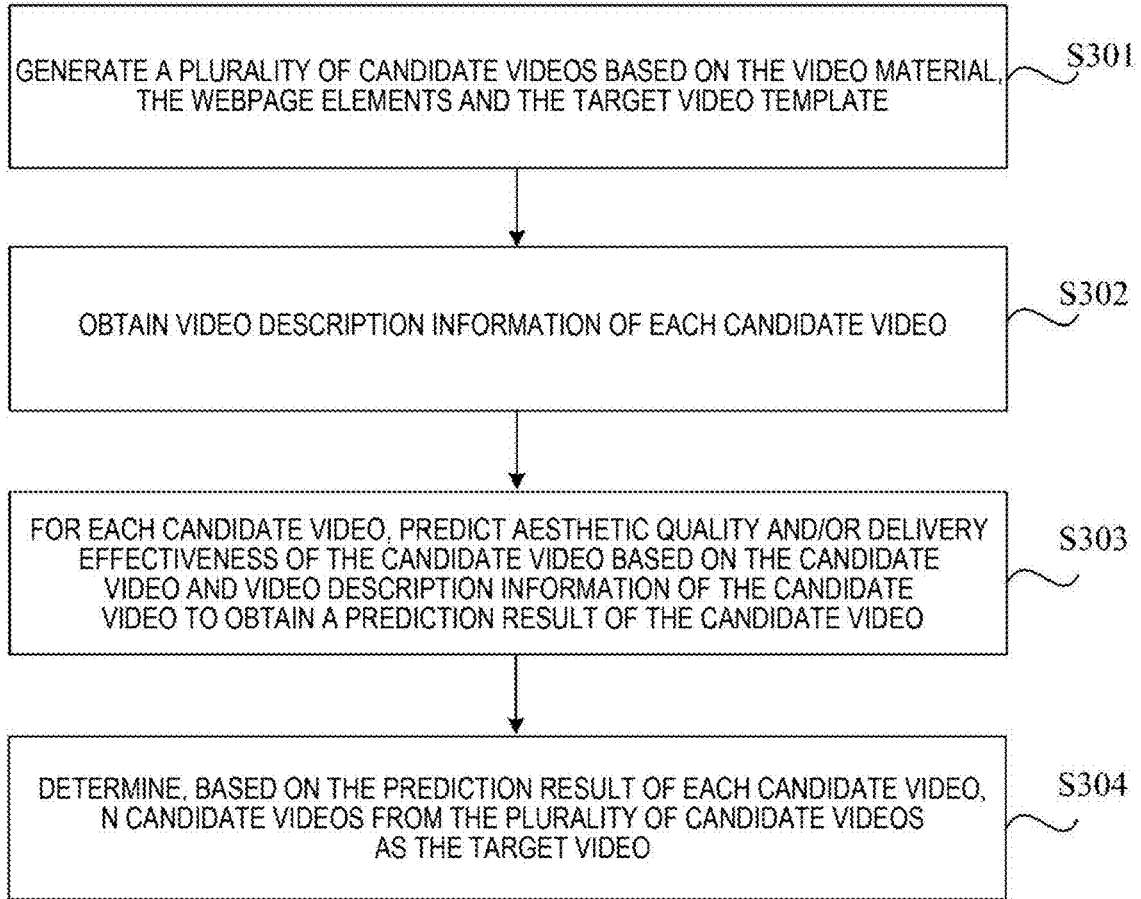

GENERATE A PLURALITY OF CANDIDATE VIDEOS BASED ON THE VIDEO MATERIAL, THE WEBPAGE ELEMENTS AND THE TARGET VIDEO TEMPLATE — S301

OBTAIN VIDEO DESCRIPTION INFORMATION OF EACH CANDIDATE VIDEO — S302

FOR EACH CANDIDATE VIDEO, PREDICT AESTHETIC QUALITY AND/OR DELIVERY EFFECTIVENESS OF THE CANDIDATE VIDEO BASED ON THE CANDIDATE VIDEO AND VIDEO DESCRIPTION INFORMATION OF THE CANDIDATE VIDEO TO OBTAIN A PREDICTION RESULT OF THE CANDIDATE VIDEO — S303

DETERMINE, BASED ON THE PREDICTION RESULT OF EACH CANDIDATE VIDEO, N CANDIDATE VIDEOS FROM THE PLURALITY OF CANDIDATE VIDEOS AS THE TARGET VIDEO — S304

METHOD, APPARATUS, MEDIUM AND ELECTRONIC DEVICE FOR VIDEO GENERATION

CROSS REFERENCE TO RELATED APPLICATIONS

This application is the U.S. National Stage of International Application No. PCT/CN2023/085775, filed on Mar. 31, 2023, which claims the benefit of Chinese Patent Application No. 202210432243.7, filed with the Chinese Patent Office on Apr. 22, 2002, and entitled "METHOD, APPARATUS, MEDIUM AND ELECTRONIC DEVICE FOR VIDEO GENERATION", which is incorporated herein by reference in its entirety.

FIELD

The present disclosure relates to the field of data processing technologies, and in particular, to a method, an apparatus, a medium, and an electronic device for video generation.

BACKGROUND

At this stage, information on the Internet usually exists in the forms of text, image, audio and video, etc., wherein video-based information is often used by users as the main way to understand things due to its advantages of rich content expression, visualization, and intuitiveness. Therefore, users want to convert traditional webpage contents into short videos to satisfy their promotion conversion purpose thereof in the field of short videos. At this stage, for webpage contents, videos are mainly generated manually or through semi-automatic methods of human-computer interaction, which has a high cost, a long cycle and a high complexity.

SUMMARY

The SUMMARY is provided in order to introduce the ideas in a brief form, which will be described in detail in the following DETAILED DESCRIPTION. The SUMMARY is not intended to identify the key features or necessary features of the technical solution to be protected, nor is it intended to limit the scope of the technical solution to be protected.

In a first aspect, the present disclosure provides a method of video generation, which includes: obtaining webpage elements of a target webpage; extracting visual features and semantic features of the webpage elements; determining a video material matching the target webpage based on the webpage elements, the visual features and the semantic features; generating a target video based on the video material and the webpage elements.

In a second aspect, the present disclosure provides an apparatus for video generation, which includes: an obtaining module configured to obtain webpage elements of a target webpage; an extraction module configured to extract the visual features and semantic features of the webpage elements obtained by the obtaining module; a determination module configured to determine a video material matching the target webpage based on the webpage elements, the visual features and the semantic features extracted by the extraction module; a generation module configured to generate a target video based on the video material determined by the determination module and the webpage elements extracted by the extraction module.

In a third aspect, the present disclosure provides a computer readable medium having a computer program stored thereon. The computer program, when executed by a processing device, implements steps of a method of video generation provided in the first aspect of the present disclosure.

In a fourth aspect, the present disclosure provides an electronic device comprising: a storage device having a computer program stored thereon; and a processing device configured to execute the computer program in the storage device to implement steps of a method of video generation provided in the first aspect of the present disclosure.

In a fifth aspect, the present disclosure provides a computer program product comprising a computer program. The computer program, when executed by a processing device, implements steps of a method of video generation provided in the first aspect of the present disclosure.

In a sixth aspect, embodiments of the present disclosure provide a computer program, when executed by a processing device, implementing steps of a method of video generation provided in the first aspect of the present disclosure.

Other features and advantages of the present disclosure will be described in detail in the subsequent DETAILED DESCRIPTION.

BRIEF DESCRIPTION OF THE DRAWINGS

The above and other features, advantages, and aspects of various embodiments of the present disclosure will become more apparent with reference to the following Detailed Description taken in conjunction with the accompanying drawings. Throughout the drawings, the same or similar reference numerals represent the same or similar elements. It is to be understood that the drawings are schematic and that the components and elements are not necessarily drawn to scale. In the drawings:

FIG. 3 is a flowchart of a method for generating a target video based on a video material, webpage elements, and a target video template illustrated according to an example embodiment.

DETAILED DESCRIPTION

Figure 1:
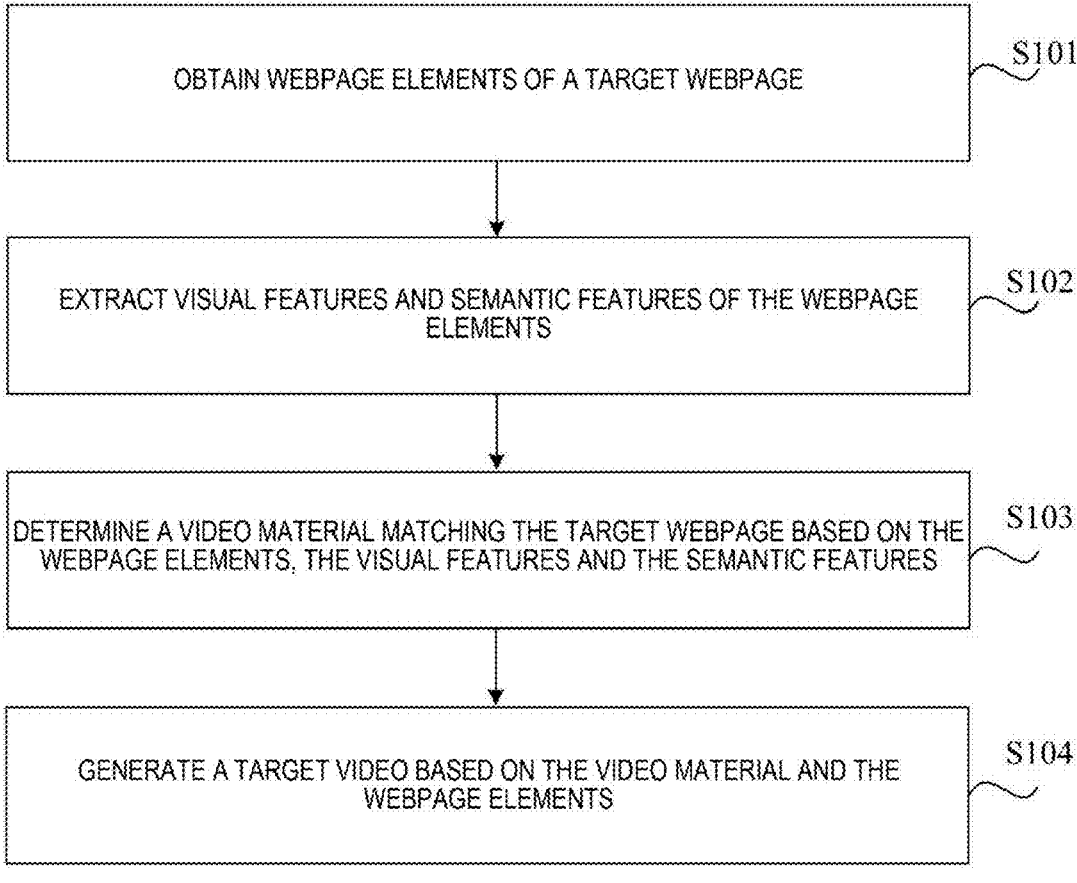
FIG. 1 is a flowchart of a method of video generation illustrated according to an example embodiment.

As discussed in BACKGROUND, at this stage, for webpage contents, videos are mainly generated manually or through semi-automatic methods of human-computer interaction. Herein, manual production costs are high, the cycle is long, and the quality of video generated by different designers is uneven, which is difficult to control, and cannot meet the demand of a large number of webpage contents into videos. Although the semi-automatic generation method of human-computer interaction can solve the problem of generation efficiency to a certain extent, it still requires manual participation, such as filtering contents extracted from webpage, selecting video templates, and secondary editing of later videos. Therefore, the production cost is still high.

In view of this, the present disclosure provides a method, an apparatus, a medium and an electronic device for video generation.

The embodiments of the present disclosure will be described in more detail below with reference to the accompanying drawings. Although certain embodiments of the disclosure are shown in the drawings, it should be understood that the present disclosure may be implemented in various forms and should not be construed as limited to the embodiments set forth herein, but rather these embodiments are provided for thoroughly and fully understand the present disclosure. It should be understood that the drawings and embodiments of the present disclosure are provided for illustrative purposes only but not intended to limit the scope of the present disclosure.

It should be understood that various steps described in the method implementations of the present disclosure may be executed in different orders and/or in parallel. Furthermore, the method implementations may include additional steps and/or the illustrated steps may be omitted. The scope of the present disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in the present disclosure are only used to distinguish different apparatuses, modules, or units, but are not used to limit the order or interdependence of the functions performed by these apparatuses, modules, or units.

It should be noted that the modifications of "one" and "a plurality of" mentioned in the present disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

It may be understood that before using the technical solutions disclosed in each embodiment of the present application, the user should be informed of the type, scope of use, usage scenarios, etc. of the personal information involved in the present application in an appropriate manner in accordance with relevant laws and regulations, and the user's authorization should be obtained.

For example, in response to receiving an active request from a user, prompt information is sent to the user to clearly remind the user that the operation requested to be performed will require obtaining and using the user's personal information. Therefore, users may autonomously choose whether to provide personal information to software or hardware such as electronic devices, applications, servers or storage medium that perform the operations of the technical solution of the present application based on the prompt information.

As an optional but non-limiting implementation, in response to receiving the user's active request, a method of sending prompt information to the user may be, for example, a pop-up window, and the prompt information may be presented in the form of text in the pop-up window. In addition, the pop-up window may also contain a selection control for the user to choose "agree" or "disagree" to provide personal information to the electronic device.

It can be understood that the above notification and obtaining user authorization processes are only illustrative and do not limit the implementations of the present application. Other methods that meet relevant laws and regulations may also be applied to the implementations of the present application.

At the same time, it can be understood that the data involved in this technical solution (including but not limited to the data itself, the obtaining or use of the data) should comply with the requirements of corresponding laws, regulations and related regulations.

FIG. 1 is a flowchart of a method of video generation illustrated according to an example embodiment. As shown in FIG. 1, this method can include the following S101 to S104.

In S101, obtain webpage elements of a target webpage.

In the present disclosure, the target webpage may be any type of webpage, such as a blog type, a news type, a forum type, etc. The webpage elements may include static elements such as fonts, texts, images, links, and dynamic elements such as videos, special effects, and moving pictures.

In S102, extract visual features and semantic features of the webpage elements.

In the present disclosure, a visual feature refers to an explicit attribute feature of a webpage elements that can be directly obtained based on the webpage elements, for example, a color, a visual size, spatial coordinates and other attribute features of the webpage elements. Herein, the visual features of webpage elements can be obtained by parsing the target webpage.

A semantic feature refers to a deep semantic feature obtained by further processing and mining of webpage elements. Specifically, the semantic features may include at least one of: a webpage type of the target webpage, a category of the webpage elements, a hidden attribute feature of the webpage elements (e.g., semantic representation of text), a spatial layout of the target webpage, or a positional relationship between different elements of the webpage elements.

For example, for webpage elements such as texts, they may include action points, prices and other categories; For webpage elements such as images, they may include categories such as figure pictures, animal pictures, landscape pictures, etc.

The spatial layout of the target webpage may include center layout, grid layout, etc. The positional relationship between different elements of the webpage elements may include a parallel relationship, an overlapping relationship, etc. Herein, the spatial layout of the target webpage and the positional relationship between the different elements of the webpage elements may be determined based on the spatial coordinates of webpage elements.

In S103, determine a video material matching the target webpage based on the webpage elements, the visual features and the semantic features.

In the present disclosure, the video material matching the target webpage may be filtered from a video material library by feature mapping based on the webpage elements, the visual features and the semantic features. Herein, the video material may include font file packages, stickers, music, images, etc.

In S104, generate a target video based on the video material and the webpage elements.

In the above technical solution, after obtaining the webpage elements of the target webpage, the visual features and semantic features of the webpage elements are extracted. Then, the video material matching the target webpage is determined based on the webpage elements, the visual features and the semantic features. Finally, based on the video material and webpage elements, the target video is generated. In this way, it is possible to achieve rapid and automatic generation of webpage content into videos, thereby greatly reducing operation costs of a user, and saving video production costs. In addition, automatic recall of the video material can be implemented without manually collecting the video material, thereby saving time and effort. In addition, when determining the video materials to be used for video generation, not only the visual features of web page elements themselves and web page elements are referred to, but also the deep semantic features of the web page elements are referred to, which can extract more rich and relevant video materials and improve the quality of video generation.

The following describes in detail the specific implementations of obtaining the webpage elements of the target webpage in S101. Specifically, it may be implemented in many ways. In one implementation, in response to receiving a page image containing the target webpage, the webpage content of the target webpage is obtained through image recognition technology. Then, the webpage elements are extracted from the webpage content. In this way, users only need to input a screenshot of the webpage to generate the corresponding video automatically and quickly, which is convenient and fast, and greatly reduces users' operating costs.

In another implementation, in response to receiving a webpage link of the target webpage, the webpage content of the target webpage is obtained based on the webpage link. Then, the webpage elements are extracted from the webpage content. In this way, users only need to input a webpage link to generate the corresponding video automatically and quickly, which is convenient and fast, and greatly reduces users' operating costs.

Specifically, the webpage content of the target webpage may be obtained in the following ways based on the webpage link: first, the webpage corresponding to the webpage link of the target webpage is loaded and rendered. Afterwards, for the webpage after being loaded and rendered, the content of webpage may be crawled through headless browser technology or crawler technology.

The specific determination method of the webpage type of the above target webpage is described in detail below. Specifically, it may be implemented through the following ways.

First, based on natural language processing and visual understanding, the hidden attribute features of webpage elements are extracted, and the categories of webpage elements are determined. Then, based on the categories and the hidden attribute features, the webpage type of the target webpage is determined.

In addition, if the target webpage includes a video, the above semantic features may further include a highlight segment of the video. In this way, when determining the video material matching the target webpage, the highlight segment may be used for feature matching, which may improve the efficiency, richness, and matching degree of video material filtering.

Figure 2:
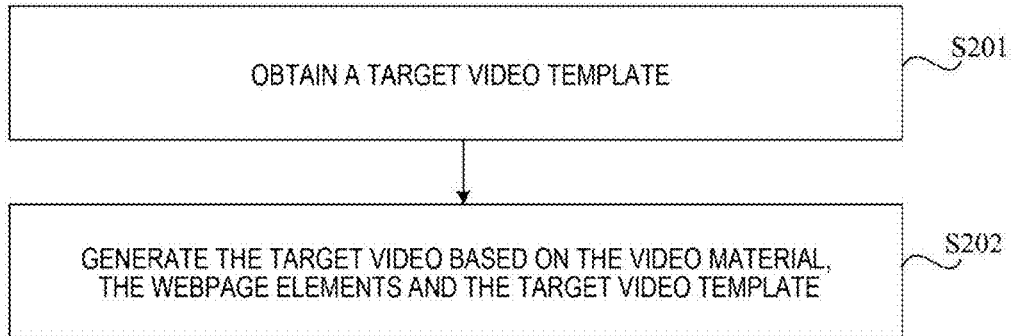
FIG. 2 is a flowchart of a method for generating a target video based on a video material and webpage elements illustrated according to an example embodiment.

Below is a detailed illustration of the specific implementation for generating a target video based on the video material and the webpage elements in S104. Specifically, it may be implemented through S201 and S202 shown in FIG. 2.

In S201, obtain a target video template.

In one implementation, a predeterminded video template may be used as the target video template.

In another implementation, the target video template matching with the target webpage may be determined from a video template library by feature matching based on the webpage elements, the visual features and the semantic features. In this way, the target video template may be more matched with the webpage content of the target webpage, and the quality of subsequent video generation may be improved.

In addition, it should be noted that one target video template may be obtained, and a plurality of target video templates may be obtained as well. The present disclosure is not specifically limited.

In S202, generate the target video based on the video material, the webpage elements and the target video template.

In one implementation, the above S201 obtains the target video template, which may fill the webpage material and the webpage elements into the target video template. Afterwards, the video is rendered and generated in time and space domains to obtain the target video. Herein, the independent variable in the time domain is time, that is, the horizontal axis is time, and the vertical axis is the change of the signal. The spatial domain, also referred to as the pixel domain, is processed at the pixel level, such as overlaying images at the pixel level.

In another implementation, a plurality of candidate videos may be generated based on the video material, the webpage elements, and the target video template, and the plurality of candidate videos may be directly used as the target video. In this way, it may ensure the diversity of generated videos to meet the needs of different users.

In another implementation, the target video may be generated by S301~S304 shown in FIG. 3.

In S301, generate a plurality of candidate videos based on the video material, the webpage elements and the target video template.

In S302, obtain video description information of each candidate video.

In the present disclosure, for each candidate video, the target number of image frames and sound information of the candidate video may be obtained. Afterwards, the target number of image frames and the sound information of the candidate video are analyzed to obtain the video description information of the candidate video.

Herein, the video description information may be a piece of text used to describe the candidate video. For example, if the candidate video is a video about visiting West Lake, the video description information may be "West Lake Tourism".

The video description information may also be text used to describe the characteristics of the video. For example, if the candidate video matches the current popular online language, for example, when there are network languages such as "make fun" in the candidate video, the video description information may be "make fun".

In S303, for each candidate video, predict aesthetic quality and/or advertising effectiveness of said candidate video based on said candidate video and video description information of said candidate video to obtain a prediction result of said candidate video.

In the present disclosure, aesthetic quality is a subject that focuses on the study of the essence and significance of beauty and is an important branch of philosophy.

In S304, determine, based on prediction results of each candidate video, N candidate videos from the plurality of candidate videos as the target video.

In the present disclosure, N≥1.

In the above implementations, the plurality of candidate videos are filtered based on aesthetic quality, which may make the target video meet the visual aesthetics. In addition, filtering the plurality of candidate videos based on delivery effectiveness (delivery performance) may make the target video achieve better delivery effectiveness.

The following describes in detail the specific implementations of generating the plurality of candidate videos based on the above video material, the webpage elements, and the target video template. Specifically, it may be implemented in many ways. In one implementation, the above S201 obtains the plurality of target video templates. At this time, for each target video template, webpage materials and webpage elements may be filled into the target video template. Afterwards, the video is rendered and generated in time domain and space domain to obtain the plurality of candidate videos.

In another implementation, the above-mentioned S201 obtains the target video template. At this time, different webpage materials and webpage elements may be filled into the target video template each time. Afterwards, the video may be rendered and generated in time and space domains to obtain the plurality of candidate videos.

The following describes in detail the specific implementations of predicting aesthetic quality and/or delivery effectiveness of the candidate video based on the candidate video and the video description information of the candidate video in S303 to obtain a predicted result of the candidate video.

In one implementation, based on the candidate video and the video description information of the candidate video, the aesthetic quality of the candidate video may be predicted, and the corresponding aesthetic quality score of the candidate video may be obtained, which is used as the prediction result of the candidate video. Specifically, the candidate video and the video description information of the candidate video may be input into a pre-trained aesthetic quality prediction model to obtain the corresponding aesthetic quality score of the candidate video.

In another implementation, based on the candidate video and the video description information of the candidate video, the delivery effectiveness of the candidate video may be predicted, and the corresponding delivery effectiveness score of the candidate video may be obtained, which is used as the prediction result of the candidate video. Specifically, the candidate video and the video description information of the candidate video may be input into a pre-trained delivery effectiveness prediction model to obtain the corresponding delivery effectiveness score of the candidate video.

In a further implementation, based on the video description information of the candidate video and the candidate video, the aesthetic quality and delivery effectiveness of the candidate video may be predicted respectively, and the aesthetic quality score and delivery effectiveness score corresponding to the candidate video may be obtained. Afterwards, the sum of the aesthetic quality score corresponding to the candidate video and the delivery effectiveness score corresponding to the candidate video may be used as the prediction result of the candidate video.

Figure 4:
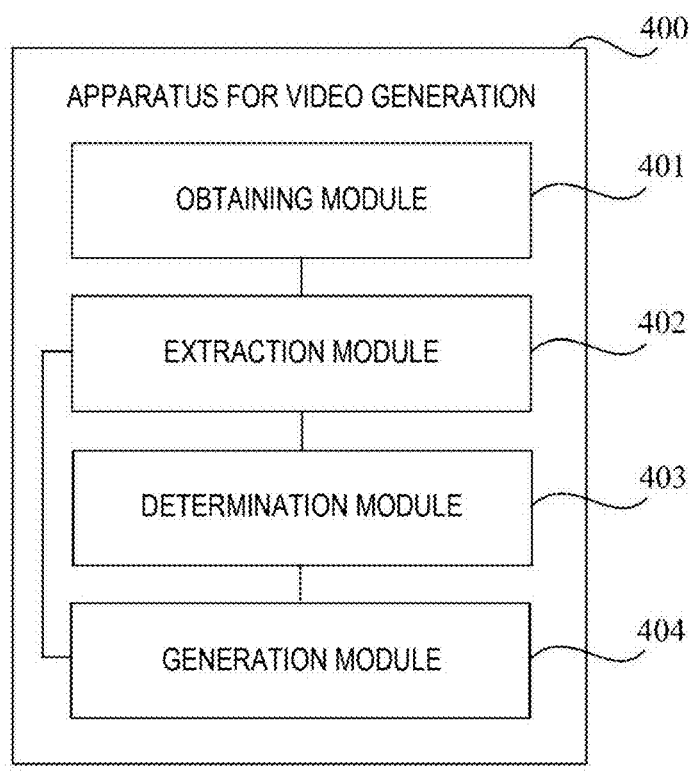
FIG. 4 is a block diagram of an apparatus for video generation illustrated according to an example embodiment.

FIG. 4 is a block diagram of an apparatus for video generation illustrated according to an example embodiment. As shown in FIG. 4, the device 400 may include:

an obtaining module 401 configured to obtain webpage elements of a target webpage;

an extraction module 402 configured to extract the visual features and semantic features of the webpage elements obtained by the obtaining module;

a determination module 403 configured to determine a video material matching the target webpage based on the webpage elements, the visual features and the semantic features extracted by the extraction module; and a generation module 404 configured to generate a target video based on the video material determined by the determination module and the webpage elements extracted by the extraction module.

In the above technical solution, after obtaining the webpage elements of the target webpage, the visual features and semantic features of the webpage elements are extracted. Then the video material matching the target webpage is determined based on the webpage elements, the visual features, and the semantic features. Finally, based on the video material and webpage elements, the target video is generated. In this way, it is possible to achieve rapid and automatic generation of webpage content into videos, thereby greatly reducing operation costs of a user, and saving video production costs. In addition, automatic recall of the video material can be implemented without manually collecting the video material, thereby saving time and effort. In addition, when determining the video materials to be used for video generation, not only the visual features of web page elements themselves and web page elements are referred to, but also the deep semantic features of the web page elements are referred to, which can extract more rich and relevant video materials and improve the quality of video generation.

Optionally, the semantic features comprise at least one of: a webpage type of the target webpage, a category of the webpage elements, a hidden attribute feature of the webpage elements, a spatial layout of the target webpage, or a positional relationship between different elements of the webpage elements.

Optionally, if the target webpage comprises a video, the semantic features further comprise a highlight segment of the video.

Optionally, the semantic features comprise a webpage type of the target webpage; the extraction module 402 includes:

a first determination sub module configured to extract, based on natural language processing and visual comprehension, the hidden attribute feature of the webpage elements, and determining the category of the webpage elements; and a second determination sub module configured to determine the webpage type of the target webpage based on the category and the hidden attribute feature.

Optionally, the generation module 404 includes:

a first obtaining sub module configured to obtain a target video template; and a first generation sub module configured to generate the target video based on the video material, the webpage elements and the target video template.

Optionally, the first obtaining sub module is configured to determine the target video template matching the target webpage based on the webpage elements, the visual features and the semantic features.

Optionally, the first generation sub module includes:

a second generation sub module configured to generate a plurality of candidate videos based on the video material, the webpage elements and the target video template;

a second obtaining sub module configured to obtain video description information of each candidate video;

a prediction sub module configured to, for each candidate video, predict aesthetic quality and/or delivery effectiveness of the candidate video based on the candidate video and video description information of the candidate video to obtain a prediction result of the candidate video; and a third determination sub module configured to determine, based on the prediction result of each candidate video, N candidate videos from the plurality of candidate videos as the target video, where N≥1.

Optionally, the obtaining module 401 includes:

a third obtaining sub module configured to, in response to receiving a webpage link of the target webpage, obtain a webpage content of the target webpage based on the webpage link; and an extraction sub module configured to extract the webpage elements from the webpage content.

The present disclosure further provides a computer readable medium on which a computer program is stored, and the program is executed by a processing device to implement the steps of the above method of video generation provided by the present disclosure.

Figure 5:
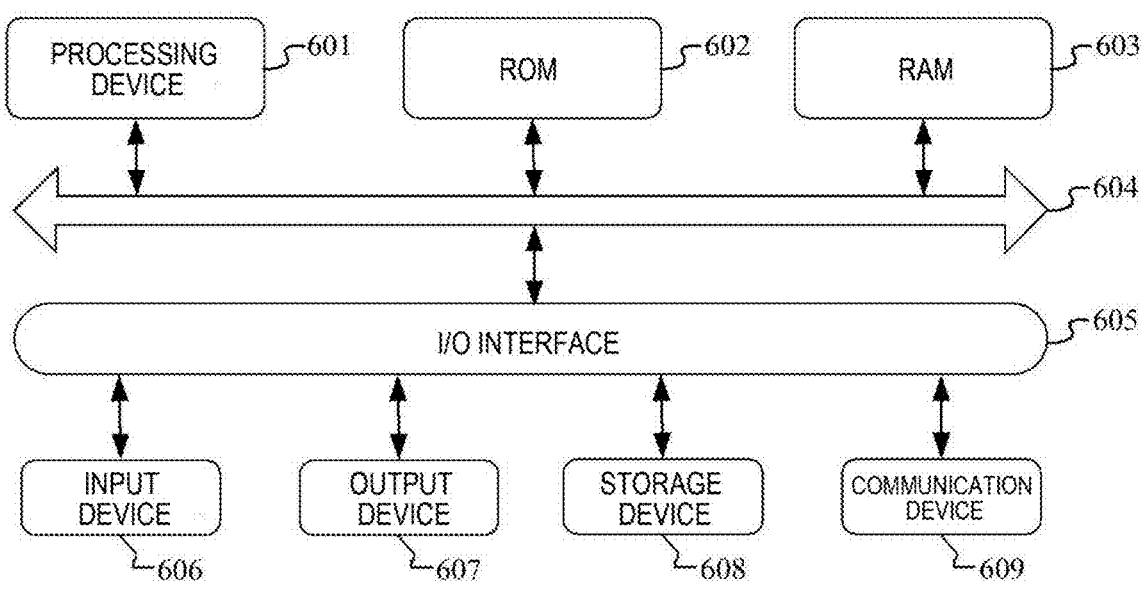
FIG. 5 is a block diagram of an electronic device illustrated according to an example embodiment.

Referring to FIG. 5, it is a structural schematic diagram of an electronic device 600 suitable for implementing an embodiment of the present disclosure. The electronic device in the embodiment of the present disclosure may include but is not limited to mobile terminals such as mobile phones, laptops, digital broadcast receivers, personal digital assistants (PDAs), tablet pads (PAD), portable multimedia players (PMPs), car-mounted terminals (such as car navigation terminals), etc., and fixed terminals such as digital TVs, desktop computers, etc., or various forms of servers such as stand-alone servers or server clusters. The electronic device shown in FIG. 5 is only an example and should not bring any limitation on the functionality and scope of use of the embodiment of the present disclosure.

As shown in FIG. 5, the electronic device 600 may include a processing device (such as a central processing unit, graphics processing unit, etc.) 601, the electronic device 600 may perform various actions and processes based on programs stored in Read-Only Memory (ROM) 602 or loaded from storage device 608 into Random Access Memory (RAM) 603. In the RAM 603, various programs and data necessary for the operation of the electronic device 600 are also stored. The processing device 601, ROM 602, and RAM 603 are connected to each other through a bus 604. An Input/Output (I/O) interface 605 is also connected to the bus 604.

Typically, the following devices can be connected to I/O interface 605: input devices 606 including, for example, touch screens, touchpads, keyboards, mice, cameras, microphones, accelerometers, gyroscopes, etc.; output devices 607 including liquid crystal displays (LCDs), speakers, vibrators, etc.; storage devices 608 including magnetic tapes, hard disks, etc.; and a communication device 609. The communication device 609 may allow the electronic device 600 to communicate with other devices wirelessly or wirelessly to exchange data. Although FIG. 5 illustrates an electronic device 600 with various devices, it should be understood that it is not required to implement or have all the shown devices. It can be implemented or equipped with more or fewer devices as an alternative.

In particular, according to the embodiments of the present disclosure, the process described above with reference to the flowchart can be implemented as a computer software program. For example, an embodiment of the present disclosure includes a computer program product, and the computer program product includes a computer program carried on a computer-readable medium, where the computer program includes program code for performing a method for recommending words. In such an embodiment, the computer program can be downloaded and installed from a network through the communication device 609, or installed through the storage device 608, or installed through the ROM 602. When the computer program is executed by the processing device 601, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. The computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as a carrier wave, the computer-readable signal medium carries computer-readable program code therein. Such propagated data signals may take many forms, including but not limited to electromagnetic signals, optical signals, or any combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, the medium includes but not limited to: wires, optical cables, RF (radio frequency), etc., or any combination thereof.

In some embodiments, clients and servers can communicate using any currently known or future developed network protocol such as Hyper Text Transfer Protocol (HTTP), and can be interconnected with any form or medium of digital data communication (such as communication networks). Examples of communication networks include local area networks (LANs), wide area networks (WANs), internetworks (such as the Internet), and end-to-end networks (such as ad hoc end-to-end networks), as well as any currently known or future developed networks.

The computer-readable medium may be included in the electronic device or may exist separately without being assembled into the electronic device.

The computer readable medium carries one or more programs. When the one or more programs are executed by the electronic device, the electronic device is caused to: obtain webpage elements of a target webpage; extract visual features and semantic features of the webpage elements; determine a video material matching the target webpage based on the webpage elements, the visual features and the semantic features; and generate a target video based on the video material and the webpage elements.

Computer program codes for performing the operations of the present disclosure may be written in one or more programming languages or a combination thereof, including but not limited to Object Oriented programming languages-such as Java, Smalltalk, C++, and also conventional proce- dural programming languages—such as "C" or similar pro- gramming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including LAN or WAN—connected to the user's computer, or may be con- nected to an external computer (e.g., through an Internet service provider to connect via the Internet).

The flowcharts and block diagrams in the accompanying drawings illustrate the architecture, functions, and opera- tions of possible implementations of the system, method, and computer program product of various embodiments of the present disclosure. Each block in a flowchart or block diagram may represent a module, program segment, or portion of code that contains one or more executable instruc- tions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flow- charts, may be implemented using a dedicated hardware- based system that performs the specified function or opera- tions, or may be implemented using a combination of dedicated hardware and computer instructions.

The module described in the embodiments of the present disclosure may be implemented by means of software or hardware, and the name of the module does not constitute a limitation on the module itself. For example, the obtaining module may further be described as "the module that obtaining the webpage elements of the target webpage".

The functions described herein above can be performed at least in part by one or more hardware logic components. For example, without limitation, exemplary types of hardware logic components that may be used include: Field Program- mable Gate Arrays (FPGAs), Application Specific Integrated Circuits (ASICs), Application Specific Standard Parts (AS- SPs), System on Chip (SOCs), Complex Programmable Logic Devices (CPLDs), and so on.

In the context of present disclosure, a machine-readable medium can be a tangible medium that may contain or store programs for use by or in conjunction with instruction execution systems, apparatuses, or devices. A machine- readable medium may be a machine-readable signal medium or a machine-readable storage medium. A machine-readable medium may include, but are not limited to, electronic, magnetic, optical, electromagnetic, infrared, or semiconduc- tor systems, apparatuses, or devices, or any suitable com- bination thereof. Specific examples of the machine-readable storage medium may include electrical connections based on one or more wires, portable computer disks, hard disks, RAM, ROM, EPROM or flash memory, optical fibers, CD-ROM, optical storage devices, magnetic storage devices, or any combination thereof.

According to one or more embodiments of the present disclosure, Example 1 provides a method of video genera- tion, including: obtaining webpage elements of a target webpage; extracting visual features and semantic features of the webpage elements; determining a video material match- ing the target webpage based on the webpage elements, the visual features and the semantic features; generating a target video based on the video material and the webpage ele- ments.

According to one or more embodiments of the present disclosure, Example 2 provides the method of Example 1, and the semantic features include at least one of: a webpage type of the target webpage, a category of the webpage elements, a hidden attribute feature of the webpage ele- ments, a spatial layout of the target webpage, or a positional relationship between different elements of the webpage elements.

According to one or more embodiments of the present disclosure, Example 3 provides the method of Example 2. If the target webpage includes a video, the semantic features further comprise a highlight segment of the video.

According to one or more embodiments of the present disclosure, Example 4 provides the method of Example 2, and the semantic features includes a webpage type of the target webpage; the webpage type is determined by: extract- ing, based on natural language processing and visual com- prehension, the hidden attribute feature of the webpage elements, and determining the category of the webpage elements; and determining the webpage type of the target webpage based on the category and the hidden attribute feature.

According to one or more embodiments of the present disclosure, Example 5 provides the method of any of Example 1-Example 4. Generating the target video based on the video material and the webpage elements includes: obtaining a target video template; and generating the target video based on the video material, the webpage elements and the target video template.

According to one or more embodiments of the present disclosure, Example 6 provides the method of Example 5, and obtaining the target video template includes: determin- ing the target video template matching the target webpage based on the webpage elements, the visual features and the semantic features.

According to one or more embodiments of the present disclosure, Example 7 provides the method of Example 5. Generating the target video based on the video material, the webpage elements and the target video template includes: generating a plurality of candidate videos based on the video material, the webpage elements and the target video tem- plate; obtaining video description information of each can- didate video; for each candidate video, predicting aesthetic quality and/or delivery effectiveness of the candidate video based on the candidate video and video description infor- mation of the candidate video to obtain a prediction result of the candidate video; and determining, based on the predic- tion result of each candidate video, N candidate videos from the plurality of candidate videos as the target video, where $N \geq 1$.

According to one or more embodiments of the present disclosure, Example 8 provides the method of any of Example 1-Example 4. Obtaining the webpage elements of the target webpage includes: in response to receiving a webpage link of the target webpage, obtaining a webpage content of the target webpage based on the webpage link; and extracting the webpage elements from the webpage content.

According to one or more embodiments of the present disclosure, Example 9 provides an apparatus for video generation, which includes: an obtaining module configured to obtain webpage elements of a target webpage; an extraction module configured to extract the visual features and semantic features of the webpage elements obtained by the obtaining module; a determination module configured to determine a video material matching the target webpage based on the webpage elements, the visual features and the semantic features extracted by the extraction module; a generation module configured to generate a target video based on the video material determined by the determination module and the webpage elements extracted by the extraction module.

According to one or more embodiments of the present disclosure, Example 10 provides a computer readable medium having a computer program stored thereon. The computer program, when executed by a processing device, implements steps of a method of any of Examples 1-8.

According to one or more embodiments of the present disclosure, Example 11 provides an electronic device, including: a storage device having a computer program stored thereon; and a processing device configured to execute the computer program in the storage device to implement steps of a method of any of Examples 1-8.

According to one or more embodiments of the present disclosure, Example 12 provides a computer program product including a computer program. The computer program, when executed by a processing device, implements steps of a method of any of Examples 1-8.

According to one or more embodiments of the present disclosure, Example 13 provides a computer program that implements steps of a method of any of Examples 1-8.

The above description is only for the preferred embodiments of the present disclosure and an explanation of the technical principles used. Those skilled in the art should understand that the scope involved in the present disclosure is not limited to technical solutions formed by specific combinations of the aforementioned technical features, and should also cover other technical solutions formed by any combinations of the aforementioned technical features or their equivalent features without departing from the disclosed concept. For example, a technical solution is formed by replacing the above features with (but not limited to) technical features with similar functions disclosed in the present disclosure.

Furthermore, although operations are depicted in a specific order, this should not be understood as requiring that these operations be performed in the specific order shown or performed in a sequential order. In certain environments, multitasking and parallel processing may be advantageous. Likewise, although several specific implementation details are included in the above discussion, these should not be interpreted as limitations on the scope of present disclosure. Certain features described in the context of individual embodiments may also be combined to be implemented in a single embodiment. On the contrary, various features described in the context of a single embodiment may also be implemented separately or in any suitable sub combination in multiple embodiments.

Although the present subject matter has been described in language specific to structural features and/or methodological logical actions, it should be understood that the subject matter defined in the attached claims may not necessarily be limited to the specific features or acts described above. On the contrary, the specific features and actions described above are only example forms of implementing the claims. Regarding the system in the above embodiments, the specific way in which each module performs operations has been described in detail in the embodiments related to this method, and will not be elaborated here.

What is claimed is:

1. A computer-implemented method of generating videos based on a webpage, comprising:
   obtaining webpage elements of the webpage;
   extracting visual features and semantic features of the webpage elements, wherein the semantic features comprise at least one of a webpage type, categories of the webpage elements, hidden attribute features of the webpage elements, or positional relationships among the webpage elements;
   identifying, from a video material library, a video material matching the target-webpage based on the webpage elements, the visual features and the semantic features;
   obtaining a video template;
   generating a plurality of candidate videos based on the video template, the video material and the webpage elements;
   generating a description of each of the plurality of candidate videos, wherein the description comprises a piece of text describing each of the plurality of candidate videos;
   predicting at least one of an aesthetic quality or a delivery effectiveness of each of the plurality of candidate videos based on the plurality of candidate videos and their respective descriptions to obtain prediction results corresponding to the plurality of candidate videos; and
   identifying, based on the prediction results, a target video from the plurality of candidate videos.

2. The method of claim 1, wherein if the webpage comprises a video, the semantic features further comprise a highlight segment of the video.

3. The method of claim 1, wherein the webpage type is determined by:
   extracting, based on natural language processing and visual comprehension, the hidden attribute features of the webpage elements, and determining the categories of the webpage elements; and
   determining the webpage type based on the categories and the hidden attribute features.

4. The method of claim 1, wherein obtaining the video template comprises:
   determining the video template matching the webpage based on the webpage elements, the visual features and the semantic features.

5. The method of claim 1, wherein obtaining the webpage elements of the webpage comprises:
   in response to receiving a webpage link of the webpage, obtaining a webpage content of the webpage based on the webpage link; and
   extracting the webpage elements from the webpage content.

6. An electronic device, comprising:
   a storage device having a computer program stored thereon; and
   a processing device configured to execute the computer program in the storage device to implement acts comprising:
   obtaining webpage elements of a webpage;
   extracting visual features and semantic features of the webpage elements, wherein the semantic features comprise at least one of a webpage type, categories of the webpage elements, hidden attribute features of the webpage elements, or positional relationships among the webpage elements;

identifying, from a video material library, a video material matching the webpage based on the webpage elements, the visual features and the semantic features;

obtaining a video template;

generating a plurality of candidate videos based on the video template, the video material and the webpage elements;

generating a description of each of the plurality of candidate videos, wherein the description comprises a piece of text describing each of the plurality of candidate videos;

predicting at least one of an aesthetic quality or a delivery effectiveness of each of the plurality of candidate videos based on the plurality of candidate videos and their respective descriptions to obtain prediction results corresponding to the plurality of candidate videos; and identifying, based on the prediction results, a target video from the plurality of candidate videos.

7. The device of claim 6, wherein the webpage type is determined by:

extracting, based on natural language processing and visual comprehension, the hidden attribute features of the webpage elements, and determining the categories of the webpage elements; and determining the webpage type based on the categories and the hidden attribute features.

8. A non-transitory computer readable medium having a computer program stored thereon, the computer program, when executed by a processing device, causes the processing device to implement acts comprising:

obtaining webpage elements of a webpage;

extracting visual features and semantic features of the webpage elements, wherein the semantic features comprise at least one of a webpage type, categories of the webpage elements, hidden attribute features of the webpage elements, or positional relationships among the webpage elements;

identifying, from a video material library, a video material matching the webpage based on the webpage elements, the visual features and the semantic features;

obtaining a video template;

generating a plurality of candidate videos based on the video template, the video material and the webpage elements;

generating a description of each of the plurality of candidate videos, wherein the description comprises a piece of text describing each of the plurality of candidate videos;

predicting at least one of an aesthetic quality or a delivery effectiveness of each of the plurality of candidate videos based on the plurality of candidate videos and their respective descriptions to obtain prediction results corresponding to the plurality of candidate videos; and identifying, based on the prediction results, a target video from the plurality of candidate videos.

9. The non-transitory medium of claim 8, wherein if the webpage comprises a video, the semantic features further comprise a highlight segment of the video.

10. The non-transitory medium of claim 8, wherein the webpage type is determined by:

extracting, based on natural language processing and visual comprehension, the hidden attribute features of the webpage elements, and determining the categories of the webpage elements; and determining the webpage type based on the categories and the hidden attribute features.

11. The non-transitory medium of claim 8, wherein obtaining the video template comprises:

determining the video template matching the webpage based on the webpage elements, the visual features and the semantic features.

12. The non-transitory medium of claim 8, wherein obtaining the webpage elements of the webpage comprises:

in response to receiving a webpage link of the webpage, obtaining a webpage content of the webpage based on the webpage link; and extracting the webpage elements from the webpage content.

13. The device of claim 6, wherein if the webpage comprises a video, the semantic features further comprise a highlight segment of the video.

*  *  *  *  *